US012025715B2

(12) United States Patent
Saxena et al.

(10) Patent No.: US 12,025,715 B2
(45) Date of Patent: Jul. 2, 2024

(54) GNSS ERROR RESOLUTION

(71) Applicant: HERE Global B.V., Eindhoven (NL)

(72) Inventors: Deekshant Saxena, Mumbai (IN); Senjuti Sen, Manpada (IN)

(73) Assignee: HERE Global B.V., Eindhoven (NL)

( * ) Notice: Subject to any disclaimer, the term of this patent is extended or adjusted under 35 U.S.C. 154(b) by 391 days.

(21) Appl. No.: 17/400,882

(22) Filed: Aug. 12, 2021

(65) Prior Publication Data

US 2023/0053157 A1 Feb. 16, 2023

(51) Int. Cl.
| | | |
|---|---|---|
| G01S 19/40 | (2010.01) | |
| G01S 19/25 | (2010.01) | |
| G01S 19/37 | (2010.01) | |
| G06N 20/00 | (2019.01) | |

(52) U.S. Cl.
CPC ............ *G01S 19/40* (2013.01); *G01S 19/258* (2013.01); *G01S 19/37* (2013.01); *G06N 20/00* (2019.01)

(58) Field of Classification Search
CPC ........ G01S 19/40; G01S 19/258; G01S 19/37; G06N 20/00
USPC .................................................... 342/357.23
See application file for complete search history.

(56) References Cited

U.S. PATENT DOCUMENTS 10,101,458 B2   10/2018   Carter
10,598,796 B1 *  3/2020   Wang .................... G01S 19/246
2008/0125971 A1 *  5/2008  van Diggelen ......... G01S 19/05
                                                  701/530
2019/0353800 A1  11/2019   Nirula et al.
2020/0049837 A1   2/2020   Werner et al.
2020/0348422 A1  11/2020   Carcanague et al.
2021/0033735 A1   2/2021   Kleeman

FOREIGN PATENT DOCUMENTS

| CN | 102084265 A * | 6/2011 | ........... G01S 19/425 |
| CN | 102939723 A * | 2/2013 | ............. G01S 19/05 |
| WO | 2020124091 A1 | 6/2020 | |

OTHER PUBLICATIONS

Du, Luyao, et al. "A Novel Error Correction Approach to Improve Standard Point Positioning of Integrated BDS/GPS." Sensors 20.21 (Oct. 29, 2020): 6162. (pp. 1-20).

Kuratomi, Alejandro. "GNSS Position Error Estimated by Machine Learning Techniques with Environmental Information Input." 2019. (pp. 1-88).

* cited by examiner

*Primary Examiner* — Harry K Liu
(74) *Attorney, Agent, or Firm* — Lempia Summerfield Katz LLC (57) ABSTRACT

Embodiments including a method and apparatus for correction of a global navigation satellite system (GNSS) are described. In one example, the apparatus includes a communication interface and a processor. The communication interface is configured to a plurality of GNSS signals. The GNSS signals may include at least one almanac value and at least one ephemeris value. The processor is configured to generate a spatio-temporal graph model based on the at least one almanac value, the at least one ephemeris value, and a predetermined offset value for a base location. The spatio-temporal graph model analyzes subsequent GNSS signals to determined a predicted offset or a corrected GNSS position.

16 Claims, 8 Drawing Sheets

GNSS ERROR RESOLUTION

FIELD

The present application relates to determining the position of a mobile device, and more specifically, to determining an offset for correcting the position of a mobile device.

BACKGROUND

The Global Positioning System (GPS) or another global navigation satellite system (GNSS) provides location information to a receiving device anywhere on Earth as long as the device has a substantial line of sight without significant obstruction to three or four satellites of the system. The GPS system is maintained and made available by the United States government. Originally, the government retained exclusive use of GPS. Over time increasing levels of accuracy of the GPS signals were made available to the public.

Accuracy of the GPS system alone is about 50 feet or 15 meters. The accuracy may be augmented using secondary techniques or systems such as the Wide Area Augmentation System (WAAS), Differential GPS (DGPS), inertial navigation systems (INS) and Assisted GPS. INS utilizes internal sensors at the receiving device for improving the accuracy of GPS. WAAS and DGPS improve accuracy using ground stations that transmit position information. However, these techniques may be costly and difficult to establish.

SUMMARY

The following embodiments provide an alternative to inertial measurement units through architecture of STGCN-CTM (Spatio Temporal Graph Convolution Network-Corrected Trajectory Mapping). The following embodiments may be utilized in a variety of devices including smartphones to be used for Autonomous Driving In on embodiment, a method for training a model for correction of a global navigation satellite system (GNSS) includes receiving a plurality of GNSS signals, including at least one almanac value and at least one ephemeris value, calculating a GNSS position based on the at least one almanac value and the at least one ephemeris value, providing the at least one almanac value and the at least one ephemeris value to a spatio-temporal graph model, and receiving a corrected value from the spatio-temporal graph model.

In another amendment, a method for correction of GNSS includes receiving a plurality of GNSS signals, including at least one almanac value and at least one ephemeris value, calculating an initial GNSS position based on the at least one almanac value and the at least one ephemeris value, receiving a predetermined offset value for a base location, and generating a spatio-temporal graph model based on the initial GNSS position, the at least one almanac value, the at least one ephemeris value, and the offset value.

In another embodiment, an apparatus for correction of GNSS includes at least a communication interface and a process. The communication interface is configured to receive a plurality of GNSS signals, including at least one almanac value and at least one ephemeris value. The processor is configured to generate a spatio-temporal graph model based on the at least one almanac value, the at least one ephemeris value, and a predetermined offset value for a base location. The spatio-temporal graph model analyzes subsequent GNSS signals to determined a predicted offset or a corrected GNSS position.

BRIEF DESCRIPTION OF THE DRAWINGS

Exemplary embodiments of the present disclosure are described herein with reference to the following drawings.

DETAILED DESCRIPTION

The following embodiments include deep-learning architecture for GPS error resolution and signal propagation without DGPS dependency, for example using spatio-temporal graph general adversarial networks (STGGAN).

Satellite locations may be estimated in the scope of a satellite signal based positioning. A satellite signal based positioning may be based for example on any kind of present and/or future Global Navigation Satellite System (GNSS), such as the Global Positioning System (GPS), GLONASS, Galileo, the BeiDou Navigation Satellite System (BDS), etc., or any combination thereof.

In a GNSS system, satellites orbiting the Earth transmit signals that a receiver may use to calculate the position of the receiver. The signals transmitted by a satellite convey a message, and a part of the message comprises a set of parameter values of an orbit model defining an orbit of the satellite for a limited period of time. Such parameter values are referred to in some of the GNSSs as the broadcast ephemeris (BE). They can be used by the receiver to compute the location of the satellite, for example in an Earth-Centered-Earth-Fixed (ECEF) coordinate system. Based on the estimated locations of a plurality of satellites and the propagation time of the signals, the receiver may compute its own position. The propagation time may be estimated from a time of transmission of the satellite signal indicated in the message and a measured time of arrival of the satellite signal at the receiver. The parameter values of the orbit model have a certain, limited validity time, during which the satellite's location can be estimated with a desired accuracy. Positioning accuracy decreases as the age of the parameter values for a satellite increases, and eventually the receiver must receive a new set of parameter values of the orbit model before it can continue with positioning.

A differential global positioning system (DGPS) is one example improvement to the global positioning system (GPS) use known base stations. For example, DGPS may include a complex system of fixed ground-based reference stations. The reference stations may store set fixed positions, which may be measured using terrestrial surveying techniques. For example, the geographic position of each of the reference station may be measured through landmarks on the ground. The reference stations, or computers therein, are configured to broadcast the difference between the GPS position indicated by the GPS satellite system alone and the set fixed positions.

In one implementation of DGPS, the United States has installed many reference stations with beacons along the coastal areas, as well as the interior, to transmit DGPS correction data. Specific radio beacon frequencies are used to transmit correction data to the GPS receiver. Using the correction data, 1 to 5 meter accuracy may be achieved in real time.

The DGPS beacons or reference stations each store a reference location that has been surveyed very accurately. Various surveying techniques may include a tripod, a plumb bob, a range stick, and a measuring rope or chain. Some techniques may include an electronic range finder.

A GPS receiver receives GPS signals. Because the location of this GPS receiver is known, the GPS equations may be performed backwards using timing signals to calculate its position correction. In some examples, the reference stations broadcast the difference between the measured satellite pseudoranges and internally computed pseudoranges as the correction. Another device, for example any GPS receiver, may combine the correction with local GPS calculations in order to correct the GPS calculations.

However, the DGPS system is difficult to implement. The entire method of GPS signal correction is costly, complex and depends heavily on a combination of additional high calibrated GPS, base stations, satellite constellation and communication. The following embodiments provide systems and techniques to correct GPS calculations without using reference stations or at least using reference stations to a lesser degree. Neural networks may be employed to improve the reference station techniques. In some embodiments, the need for reference stations may be eliminated.

Moreover, satellite geometry errors are not controllable. The amount of error if the satellites that provide the GNSS signals are in an alignment or arrangement that reduces error. In GNSS, the GDOP (geometric dilution of precision) or PDOP (position dilution of precision) describes the error caused by the relative position of the GPS satellites or satellite geometry. Basically, the more signals a GPS receiver can "see" (spread apart versus close together), the more precise it can be. Thus, GPS signal received suffers from DOP errors.

The following embodiments predict satellite trajectories in case the DOP error is high. The dependency on when the satellites in GPS constellation can be in best position is thus eliminated. DGPS correction is based on a base GPS receiver. The base GPS receiver for high precision quick surveys may require about 8-10 hours for setup (depending on weather condition, sky condition, time of the day, topography, etc). Also the base GPS needs to be high calibrated device inducing cost. The following embodiments eliminate the constraints of time and cost and provide a scalable solution.

In addition, rather than because current HD GNSS still depends on corrected GPS signal and traditional GPS collection and correction process to further provide precise location points, the following embodiments may be applied upstream in the process, where the dependency on GPS hardware and processing units is eliminated.

Figure 1:
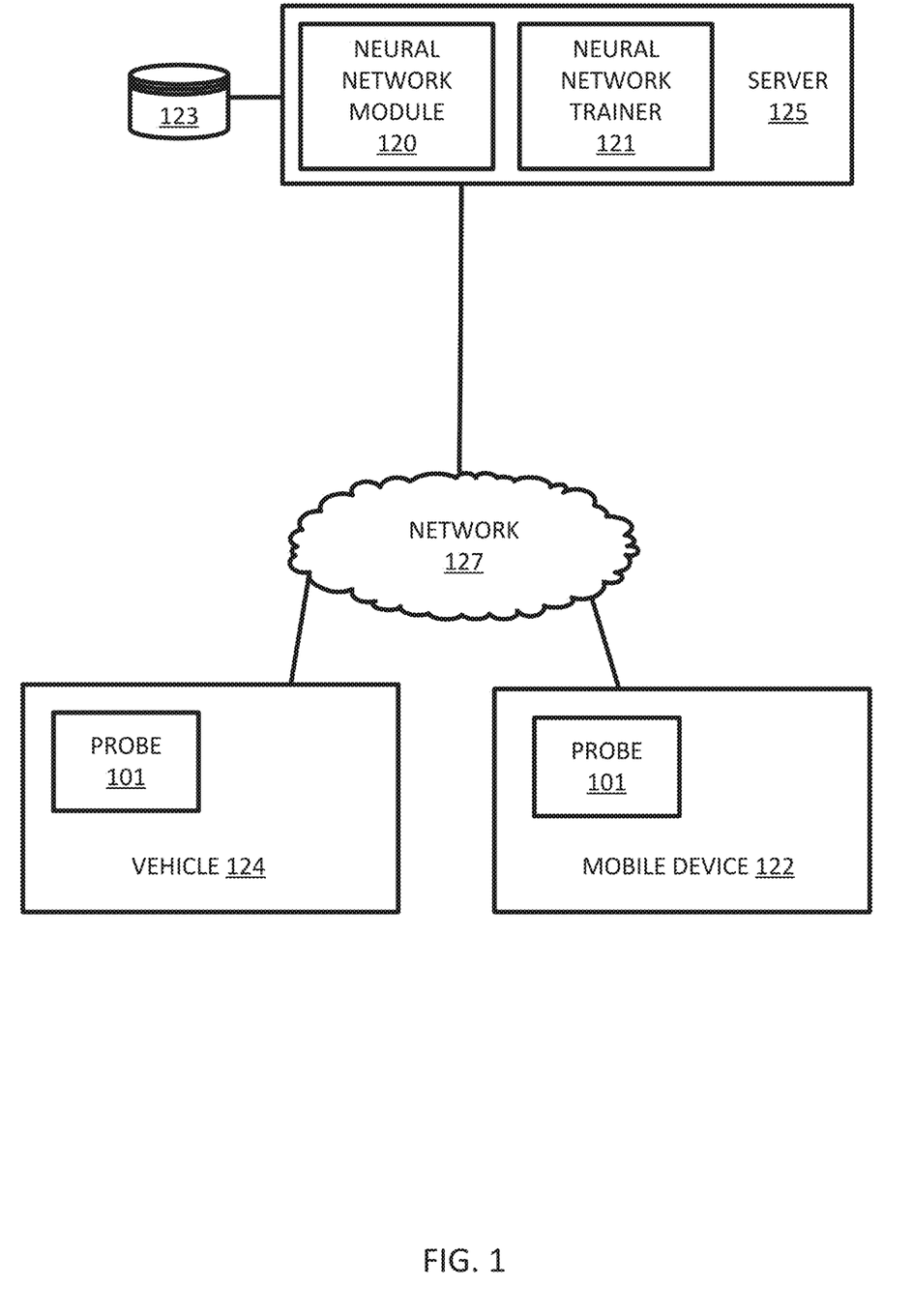
FIG. 1 illustrates a system for defining a model capable of determining a corrected position of a mobile device.

FIG. 1 illustrates a system for defining a model capable of determining a corrected position of a mobile device. In addition or in the alternative, the system is capable of determining a corrected position of a satellite of the GNSS system or a corrected position of a mobile device or other receive using the defined model.

The system for defining a model capable of determining a corrected position or position of a mobile device in FIG. 1 includes a server 125. The server 125 is connected to one or more vehicle(s) 124 and/or a mobile device(s) 122 via a network 127. The server may further be connected to a database 123. Additional, different, or fewer components may be included.

The mobile device 122 and/or vehicle 124, or multiple mobile devices 122 and vehicles 124 may be connected to the server 125. A vehicle 124 may be connected to a server via a mobile device 122. The server 125 exchanges (e.g., receives and sends) data from the one or mobile devices 122 and/or vehicles 124 via the network 127.

Communication between the vehicles 124 and/or between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, 5G, DSRC (dedicated short range communication), or another protocol.

In some embodiments, the server includes a neural network module or driver 120 and a neural network trainer 121, which may be implemented by one or more processors. In this embodiment, the server 125 may be configured to define the model using the neural network module 120 and the neural network trainer 121. The one or more mobile device(s) 122 and/or vehicle(s) 124 may collect location data via a probe 101. The neural network trainer 121 may calculate a difference between the various location data collected by the mobile device(s) 122 and/or the vehicle(s) 124 and ground truth data. The ground truth data may include ground truth location data that describes the surveyed locations of one or more base stations or that describes locations from historical GPS corrections previously performed, for example, by DGPS. The neural network trainer 121 may use the calculated difference to define the model.

In some embodiments, the mobile device(s) 122 and/or vehicle(s) 124 may include a neural network processor and a neural network trainer (not shown). In these embodiments the mobile device(s) 122 and/or vehicle(s) 124 may be configured to define the model using their respective neural network processor and neural network trainer. The mobile device(s) 122 and/or vehicle(s) 124 may collect location data using a probe 101. The neural network trainer may define the model using various location data gathered by the mobile device(s) 122 and/or vehicle(s) 124.

Each mobile device 122 and/or vehicle 124 may include position circuitry for a probe 101 and/or a second probe 102 such as one or more processors or circuits for generating probe data.

The probe 101 may collect GNSS location data of the mobile device 122 or vehicle 124. The probe may generate GNSS location data by receiving GNSS signals and comparing the GNSS signals to a clock to determine the absolute or relative position of the mobile device 122 and/or vehicle 124. Absolute and relative positions of the mobile device 122 and/or vehicle 124 may be determined at multiple locations such that a first measured pathway of the mobile device 122 or vehicle 124 is defined. The GNSS location data collected by the probe 101 may comprise a plurality of nodes. The nodes collected by the probe 101 may be a plurality of GNSS coordinates in space. The nodes collected by the probe 101 may be a plurality of undirected nodes. The undirected nodes may be a plurality of GNSS coordinates collected, without indication as to which GNSS coordinate comes relative to the other GNSS coordinates sequentially.

The probe data may include a geographic location such as a longitude value and a latitude value. In addition, the probe data may include a height or altitude. The probe data may be collected over time and may include timestamps. In some examples, the probe data is collected at a predetermined time interval (e.g., every second, ever 100 milliseconds, or another interval). In some examples, the probe data is collected in response to movement by the probe 101 (i.e., the probe reports location information when the probe 101 moves a threshold distance). The predetermined time interval for generating the probe data may be specified by an application or by the user. The interval for providing the probe data from the mobile device 122 and/or vehicle 124 to the server 125 may be may the same or different than the interval for collecting the probe data. The interval may be specified by an application or by the user.

The neural network trainer 121 may define the model, which may be a deep learning model such as a spatio-temporal graph for a generative adversarial network (STG-GAN). The model may be configured, through configuration setting or the training procedure, to output corrected GPS position. The model may be configured, through configuration setting or the training procedure, to output a correction value or offset to correct the GPS position as determined by the GPS receiver.

The neural network trainer 121 may include a feedback control system, as described in more detail with FIG. 5 below. Once the base location is predicted, it will be offset from the known location to provide the predicted error. This synthetically generated position and error will then be compared with the historical data of true corrected errors using the discriminator and generator model. In the final stage when the discriminator can no longer differentiate the generated synthetic positions and offset from itself, the output of the model will be considered as corrected GPS signal and propagated to the one or more GPS receivers.

The one or more mobile devices 122 and/or vehicles 124 may include mapping applications, navigational applications, or driving applications, which utilize the neural network analysis of data collected at the vehicle. The driving applications may generate warnings or other messages for a driver or passenger of the vehicle. The mapping applications may provide maps including the location of the vehicle as determined by the localization. The navigational applications may present routes (e.g., turn-by-turn directions) that are calculated according to the neural network analysis of data collected at the vehicle.

The one or more mobile devices 122 and/or the vehicles 124 may include local databases corresponding to a local map, which may be modified by the server 125 using the database 123. The mobile devices 122 may be standalone devices such as smartphones or devices integrated with vehicles. In some embodiments the local maps are modified according to data collected by the mobile device 122 or vehicle 124. In other embodiments, the collected data is transferred to the server 125 for augmenting the database 123.

The system for determining a corrected position of a mobile device according to FIG. 1 includes a server 125. The server is connected to a mobile device 122 or a vehicle 124 via a network 127. The system may further include a database 123 connected to the server 125 and configured to store the defined model.

The mobile device 122 or vehicle 124 may include a probe 101. The probe 101 may collect GNSS location data of the mobile device 122 or vehicle 124. The probe may generate GNSS location data by receiving GNSS signals and comparing the GNSS signals to a clock to determine the absolute or relative position of the mobile device 122 and/or vehicle 124. Absolute and relative positions of the mobile device 122 and/or vehicle 124 may be determined at multiple locations such that a first measured pathway of the mobile device 122 or vehicle 124 is defined. The GNSS location data collected by the probe 101 may comprise a plurality of nodes. The nodes collected by the probe 101 may be a plurality of GNSS coordinates in space. The nodes collected by the probe 101 may be a plurality of undirected nodes. The undirected nodes may be a plurality of GNSS coordinates collected, without indication as to which GNSS coordinate comes relative to the other GNSS coordinates sequentially.

In some embodiments, the mobile device 122 or vehicle 124 may include a neural network processor 211 configured to operate or execute a defined model. The neural network processor may input the first measured pathway determined by the mobile device 122 or vehicle 124 into the defined model. The neural network processor 211 may determine a series of geographic positions, or a trajectory of the mobile device 122 or vehicle 124 using the measurements included in the GNSS signal and the defined model.

Figure 2:
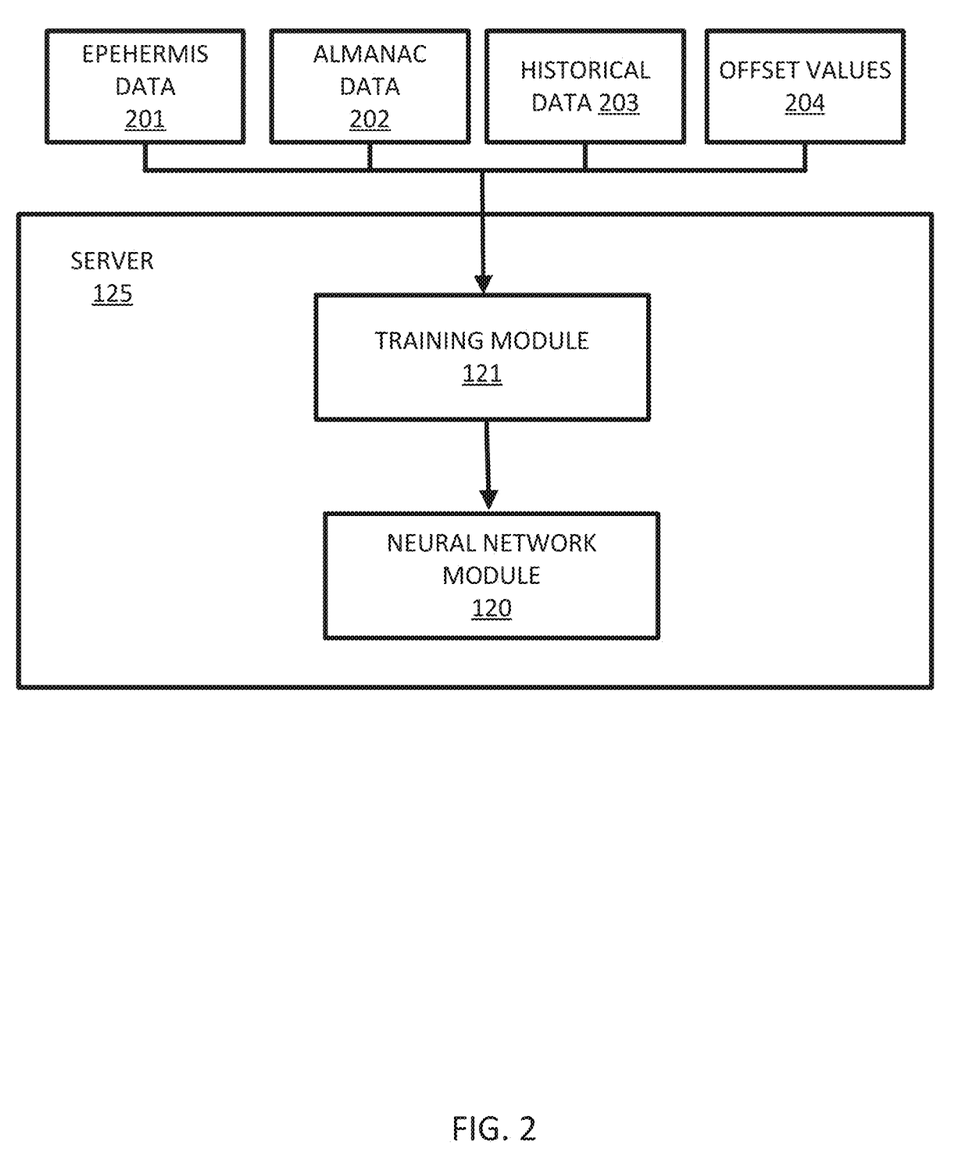
FIG. 2 illustrates an example of the model of FIG. 1.

FIG. 2 illustrates a framework for defining a model configured to detect the position, or correct the detected position, of a mobile device 122 or a vehicle 124. The server 125 includes at least a training module 121 and a neural network module 120 for implementing the neural network. The output of the neural network module 120, when it is trained and processes GPS signals, may be sent to a GPS receiver 131. Another device, for example an offset module 230, may be configured to receive the output of the neural network module 120 and identify the offset needed for the GPS calculations of the GPS receiver 131. Additional, different, or fewer components may be included.

The inputs to the training module 121 may include ephemeris data 201, almanac data 202, historical data 203, and offset values 204. The ephemeris data 201 and the almanac data 202 are transmitted from each of the satellites as part of the GPS signals.

The ephemeris data 201 may include information about each satellite's location (current and predicted), timing and health via what is known as the ephemeris data 201. This data is used by the GPS receivers to estimate location relative to the satellites and thus position on earth. The ephemeris data 201 can also be used to predict future satellite conditions (for a given place and time) providing a tool for planning when (or when not) to schedule GPS data collection.

The ephemeris data 201 may include a week number, a satellite accuracy value, an age of data, one or more satellite clock correction coefficients, and/or orbital parameters. The ephemeris data 201 may be considered valid for a predetermined time (e.g., two hours before and two hours after) with respect to the time of ephemeris. The time of ephemeris may be when the data was computed. The ephemeris data 201 may include satellite elevation, azimuth, bearing, a property of an axis or inclination correction. The ephemeris data 201 may include at least one ephemeris value includes trajectory information.

The almanac data 202 may include satellite information for the constellation of satellites (i.e., multiple satellites). The almanac data 202 may include coarse orbit and status information for each satellite in the constellation, an ionospheric model, and information to relate GPS derived time to Coordinated Universal Time (UTC).

Figure 3:
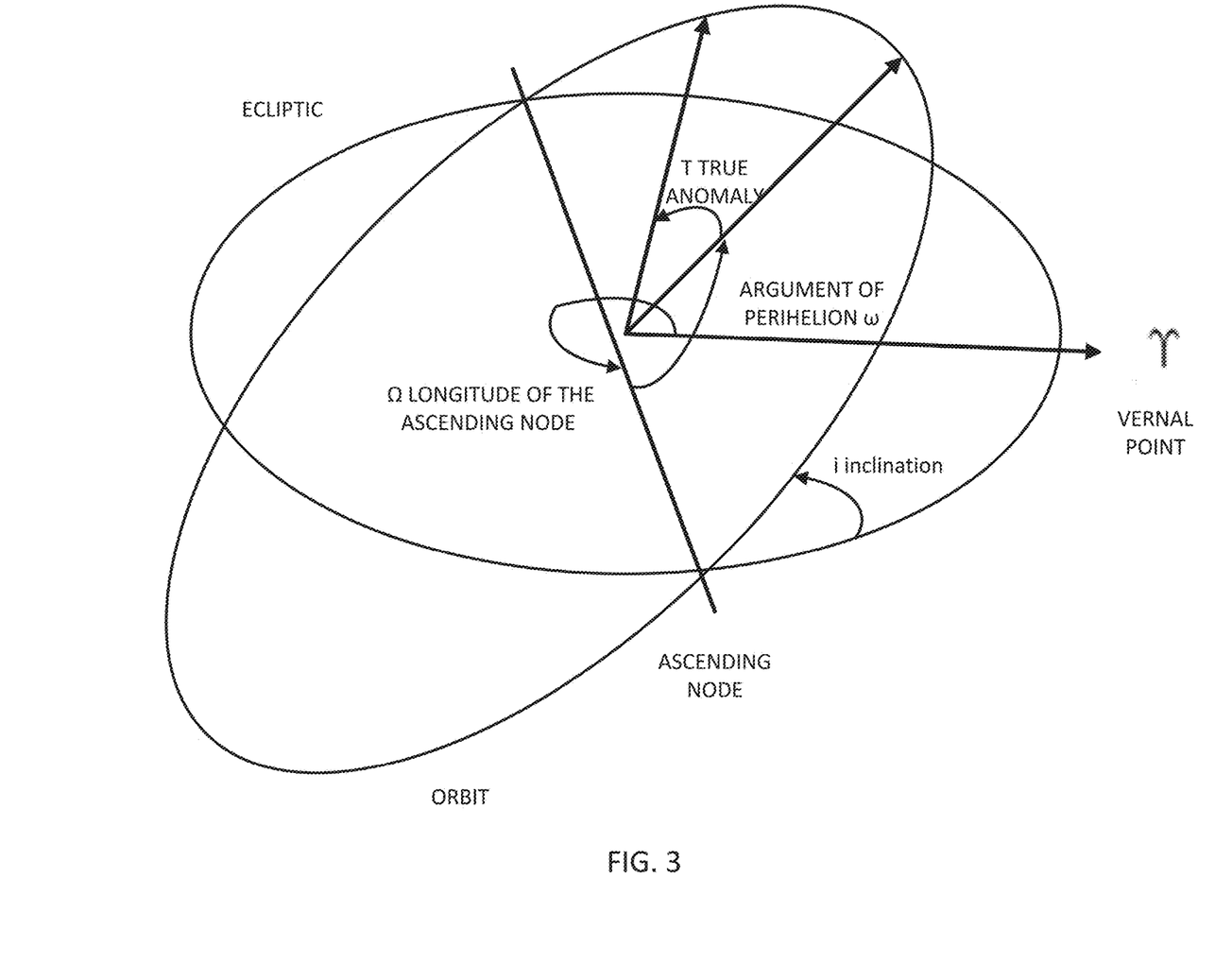
FIG. 3 illustrates another example of the model of FIG. 1.

FIG. 3 illustrates example values for trajectory in the ephemeris data 201 and clock values in the almanac data 202. FIG. 3 provides description of geocentric datum and what is the nomenclature of different axis and angles. These values are used to find location of object with respect to the earth surface (i.e., the argument of perigee angle ω). This angle describes the orientation of an orbit within its orbital plane. It is the angle between the ascending node and perigee, measured in the direction of the satellite's motion. It is a ω=arccosn·e|n||e| where: n is the vector pointing towards the ascending node (i.e. the z-component of n is zero), e is the eccentricity vector (the vector pointing towards the periapsis))

The historical data 203 may include GPS locations that have been previously calculated using the existing base station technique (e.g., DGPS). The historical data 203 may include pairwise sets of location data. These are locations calculations that were performed in the past by various GPS receivers in combination with the base state or other correction technique. Each pair may include the original location calculated from the GPS signal and the corrected location based on the calculations performed with respect to the base station or other correction technique. Alternatively, the historical data 203 includes only the original location calculated from the GPS signal. In this case, the offset values 204 may describe the offset used to correct the original location calculated from the GPS signal to the corrected values. The offset values 204 may be the offset calculated at the base station for the difference between the known or surveyed position and the detected position.

The defined model may be a convolutional network. The defined model may be a spatiotemporal graph convolutional network. The defined model may comprise one or more layers with one or more nodes.

The model is trained according to past ephemeris data 201 and almanac data 202 using the already calculated historical data 203 and/or offset values 204. That is known positions are paired with GNSS calculated positions to train the model. Specifically, the neural network module 120 may receive an offset value determined for a base location. The offset value may be a difference between the surveyed positions and the position calculate ed from GNSS. The offset value may have multiple vales corresponds to different directions such as (X, Y, Z) or (latitude, longitude, altitude). This process is repeated multiple times for different scenarios for the training values in past ephemeris data 201 and almanac data 202 in order to generate a spatio-temporal graph model based on the initial GNSS position and the offset value.

Figure 4:
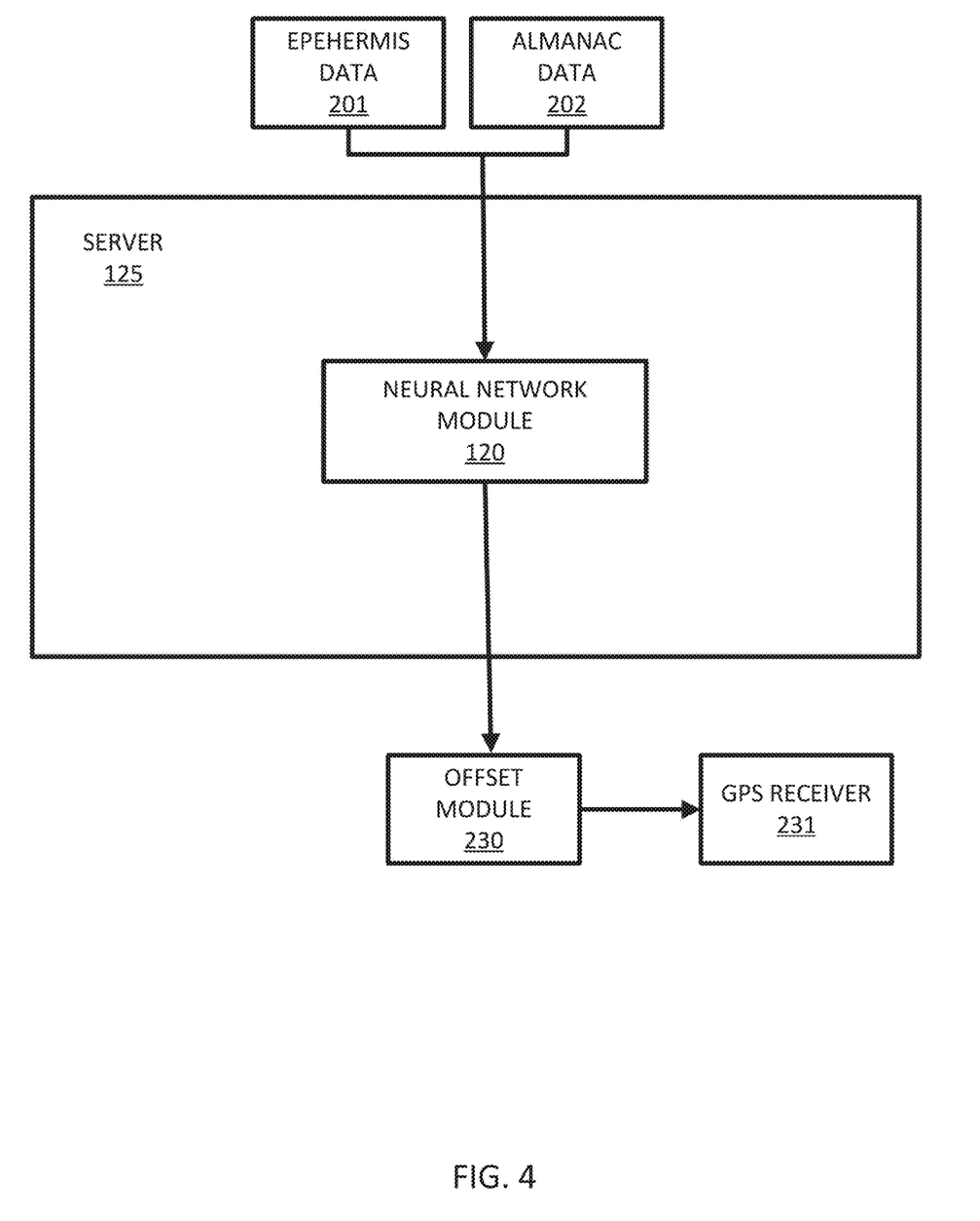
FIG. 4 illustrates examples nodes for the model of FIG. 1.

Once trained, the neural network of the neural network module 120 is configured to receive new ephemeris data 201 and almanac data 202 and predict the offset values without using the known positions (i.e., without the base stations). FIG. 4 illustrates examples nodes for the model of FIG. 1.

FIG. 4 illustrates a trained neural network model implemented by the neural network module 120 of the server 125. After the neural network is trained, the neural network module 120 receives data from a GPA signal ephemeris data 201 and almanac data 202. The neural network module 120 is configured to receive GPS signals over time and/or GPS signals from multiple satellites simultaneously or at substantially the same time. Thus, the neural network module 120 receives multiple GNSS signals, including at least one almanac value and at least one ephemeris value.

In some examples, the neural network outputs the corrected GPS position directly, and in other examples, the neural network outputs an estimated offset to be used with GPS positions. The neural network module 120 is configured to calculate an initial GNSS position based on the at least one almanac value and the at least one ephemeris value. The initial position may be correct, or within an acceptable amount of error if the satellites that provide the GNSS signals are in an alignment or arrangement that reduces error. In GNSS, the GDOP (geometric dilution of precision) or PDOP (position dilution of precision) describes the error caused by the relative position of the GPS satellites or satellite geometry. Basically, the more signals a GPS receiver can "see" (spread apart versus close together), the more precise it can be.

From the observer's point of view, or that of the GPS receiver, if the satellites are spread apart in the sky, then the GPS receiver has a good GDOP. But if the satellites are physically close together, then the GPS receiver may experience poor GDOP. This lowers the quality of the initial GPS position significantly (e.g., potentially by meters).

In one implementation, the GPS receiver includes a communication interface configured to receive a plurality of GNSS signals, including at least one almanac value and at least one ephemeris value and the neural network module 120 includes a processor configured to generate a spatio-temporal graph model based on the at least one almanac value, the at least one ephemeris value, and a predetermined offset value for a base location. The spatio-temporal graph model analyzes subsequent GNSS signals to determine a predicted offset or a corrected GNSS position.

Figure 5:
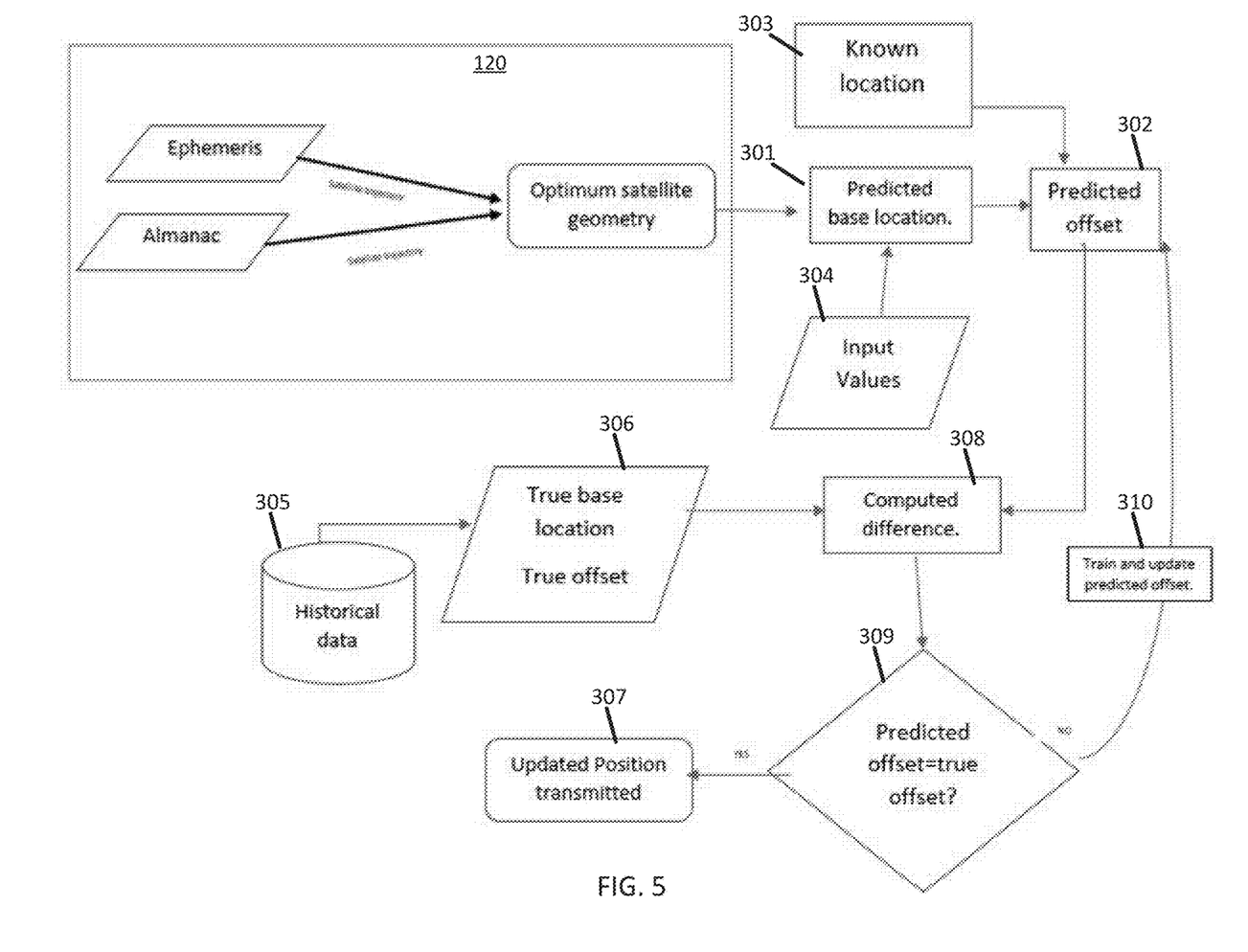
FIG. 5 illustrates an example framework for training the model of FIG. 1.

FIG. 5 illustrates an example framework for training the model of FIG. 1. The process illustrated in FIG. 5 is iterative and multiple acts are repeated. The order of the acts is not specified in the order the acts are discussed.

Generally, the neural network training module 121 outputs a predicted base location at act 130. In addition to the ephemeris and almanac values, other inputs to the neural network training module 121 may include a synchronized GNSS atomic clock time (kept at a terrestrial location) and a speed of transmission for a particular frequency used by the GNSS system or a particular satellite or constellation of satellites.

The predicted base location may not initially be close to the known location shown at box 303 but as the process repeated the predicted base location and the known location converge. At act 302, the difference between the predicted base location and the known location is calculated as the predicted offset.

A database 305 includes historical data. For the particular location under prediction or training by the neural network training module 121, the database 305 is queried for the true base location and/or true offset as illustrated by box 306. The neural network training module 121 calculates a difference between the true offset and the predicted offset at act 308.

The neural network training module 121 determines whether to continue training the model based on the difference between the true offset and the predicted offset. At act 309, the neural network training module 121 compares the difference (i.e., compares the true offset and the predicted offset). This is one example of a difference between the corrected value to a true value where the true value is based on historical data.

The neural network training module 121 may compare the difference to a threshold. The threshold may a percentage or a value that indicates the accuracy of the model. When the predicted offset is not equal to, or more than the threshold amount away from the true offset, the predicted offset shown at 302 is updated and training continues (e.g., the process repeats with another location or at another time instance). Thus, the neural network training module 121 sends the corrected value for the offset to the model when the difference between the predicted offset and the true offset is greater than the threshold.

When the predicted offset is equal to, or nearly equal to within the threshold, the true offset, the neural network training module 121 stops training and an updated position is transmitted. The neural network training module 121 may be deployed or otherwise ready to use for predicting locations or offsets for the GNSS system. The neural network training module 121 may be sent, when the difference is less than the threshold, the corrected value to a mobile device or a GNSS receiver.

The GNSS receiver is configured to calculate a position based on the corrected value received from the spatio-temporal graph model of the neural network training model 121. Alternatively or in addition, the GNSS receive is configured to calculate a GNSS error based on the corrected value received from the spatio-temporal graph model.

Figure 6:
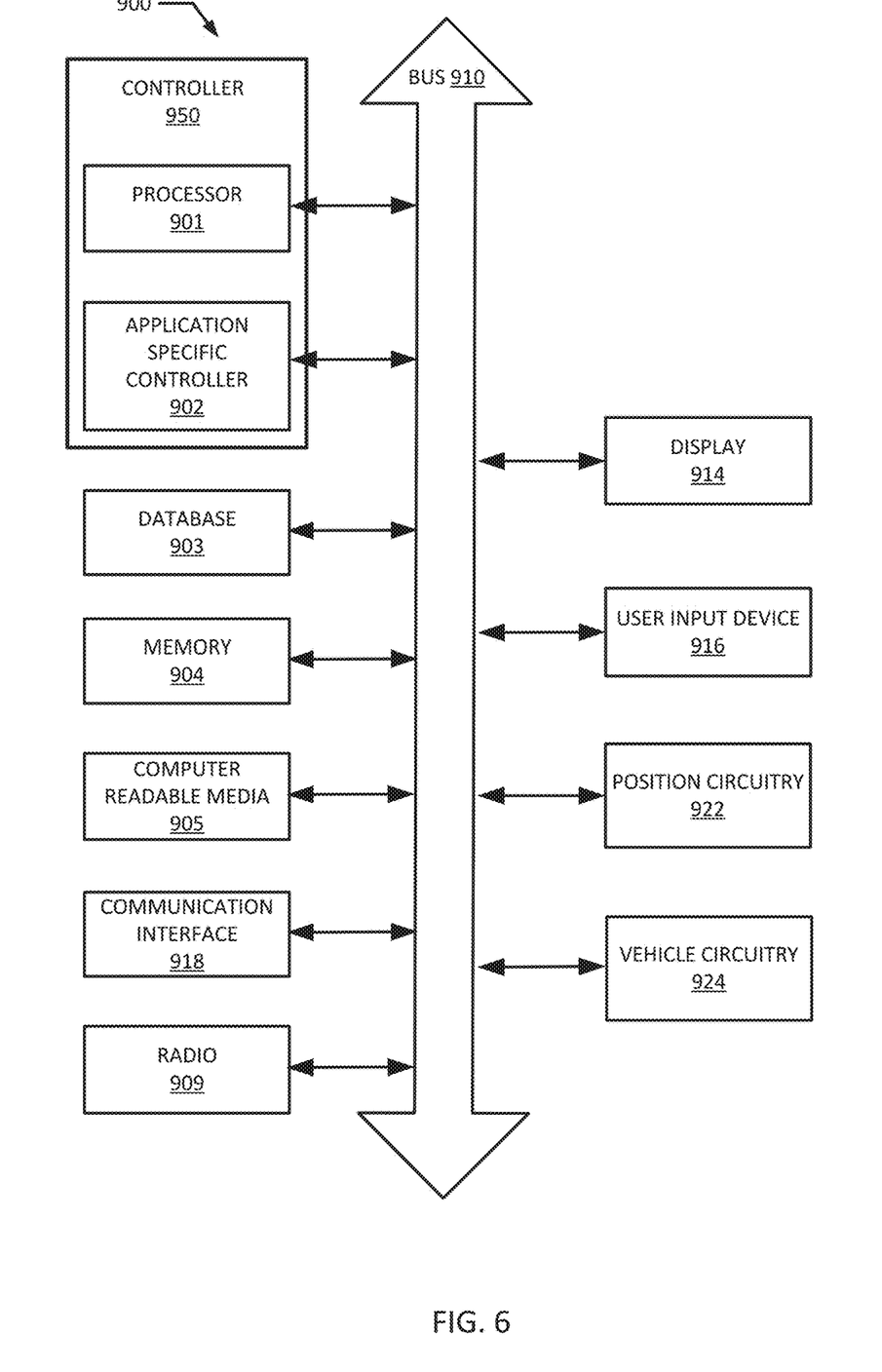
FIG. 6 illustrates an apparatus for determining a corrected position of a mobile device according to an exemplary embodiment of the present disclosure.

FIG. 6 illustrates an example flow chart for defining a model for estimating a GNSS position according to an exemplary embodiment of the present disclosure. The acts may be performed by the server 125, the neural network module 120, or another correction device. Additional, different, or fewer acts may be provided.

At act S101, the probe 101 receives a GNSS signal. A processor of the correction device may identify one or more ephemeris values and one or more almanac values from the GNSS signal.

At act S103, the correction device accesses a memory, either internal or external to the correction device, and retrieves a predetermined offset. The predetermined offset may be determined using past GNSS signals and a surveyed geographical position determined terrestrially on via the ground (i.e., measurements made on the surface of the Earth).

At act S105, the neural network model is trained based on the predetermined offset, the at least one ephemeris value, and the almanac value. The neural network may be trained to output based on the ephemeris value and the almanac value.

At act S107, the correction device tests the output of the neural network model using additional geographic points, or different instances in time, where the GNSS offset or position has been previously determined. In this way, act S105 is repeated. The training of the model may be repeated until the testing in act S107 indicates that the model is accurately predicting the GNSS offset or position within an acceptable margin of error.

Figure 7:
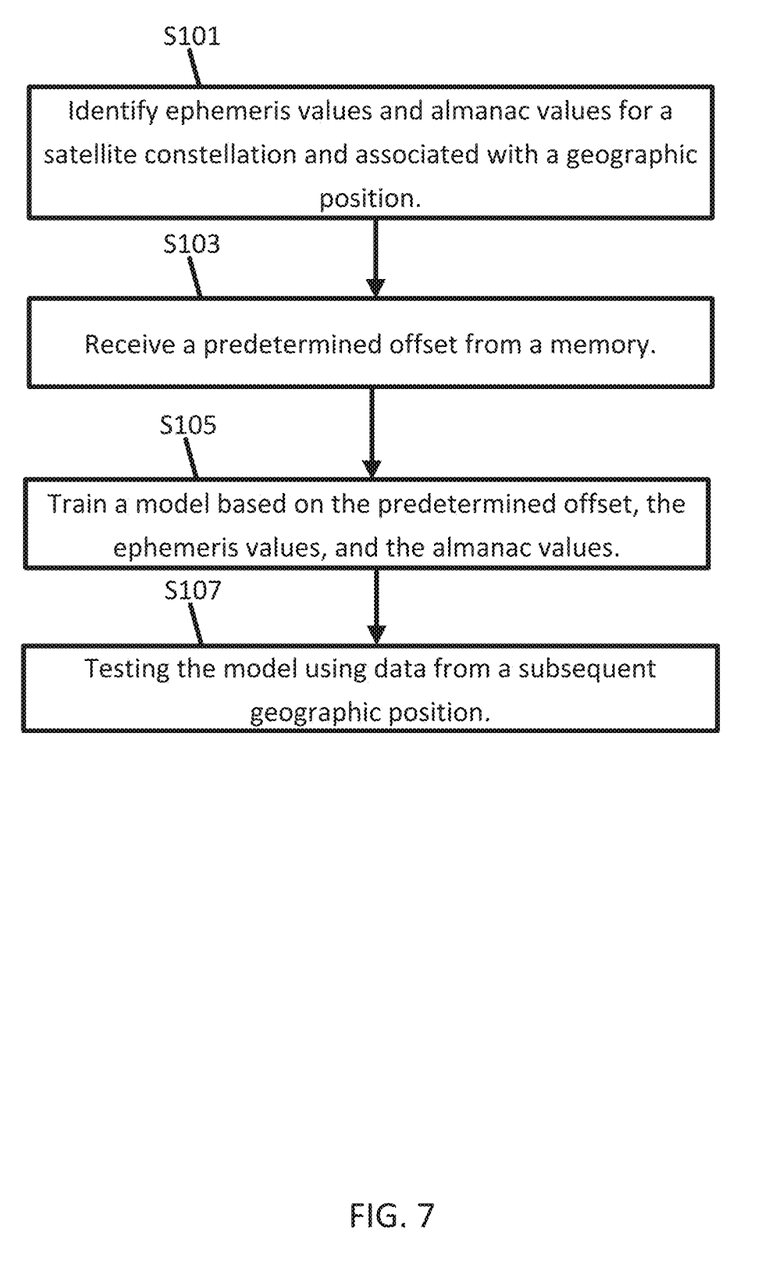
FIG. 7 illustrates an example flow chart for defining a model for estimating a position according to an exemplary embodiment of the present disclosure.

FIG. 7 illustrates an apparatus for defining a model configured to determine a corrected position of a mobile device 122 or a vehicle 124 according to an exemplary embodiment of the present disclosure. The apparatus 900 includes a bus 910 facilitating communication between a controller that may be implemented by a processor 901 and/or an application specific controller 902, which may be referred to individually or collectively as the controller 950, and one or more other components including a database 903, a memory 904, a computer readable medium 905, a communication interface 918, a radio 909, a display 914, a user input device 916, position circuitry 922, and vehicle circuitry 924. The contents of the database 903 are described with respect to the database 123. The communication interface 918 may be connected to the internet and/or other networks. The other networks may be a content provider server and/or a service provider server. The vehicle circuitry 924 may include any of the circuitry and/or devices described with respect to FIG. 10. Additional, different, or fewer components may be included.

The communication interface 918 may include any operable connection. An operable connection may be one in which signals, physical communications, and/or logical communications may be sent and/or received. An operable connection may include a physical interface, an electrical interface, and/or a data interface. The communication interface provides for wireless and/or wired communications in any known or later developed format. The communication interface 918 may be connected to the internet and/or other networks. The other networks may be a content provider server or service provider server.

The memory 904 may be a volatile memory or a non-volatile memory. The memory 904 may include one or more of a read only memory (ROM), random access memory (RAM), a flash memory, an electronic erasable program read only memory (EEPROM), or other type of memory. The memory 904 may be removable from the apparatus 900, such as a secure digital (SD) memory card.

The memory 904 and/or the computer readable medium 905 may include a set of instructions that can be executed to cause the controller to perform any one or more of the methods or computer-based functions disclosed herein.

Figure 8:
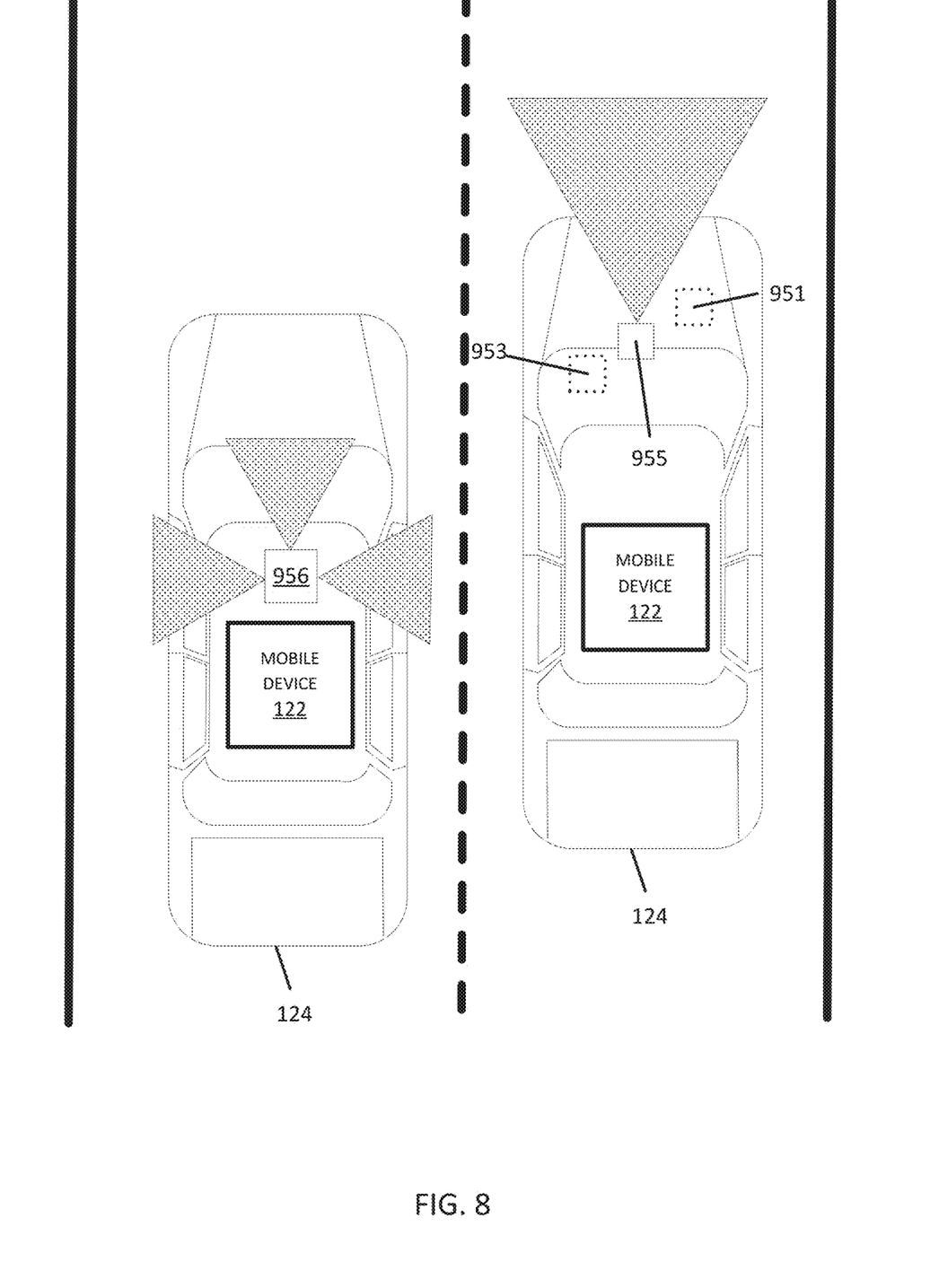
FIG. 8 illustrates a vehicle in accordance with an embodiment of the present disclosure.

FIG. 9 illustrates an exemplary vehicle 124 of the system of FIG. 1. The vehicles 124 may include a variety of devices such as a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively or additionally, the one or more detectors or sensors may include an accelerometer built or embedded into or within the interior of the vehicle 124. The vehicle 124 may include one or more distance data detection device or sensor, such as a light detection and ranging (LiDAR) device. The distance data detection sensor may generate point cloud data. The distance data detection sensor may include a laser range finder that rotates a mirror directing a laser to the surroundings or vicinity of the collection vehicle on a roadway or another collection device on any type of pathway.

A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle 124. The sensor array may include multiple sensors. Example sensors include an optical distance system such as LiDAR 116, an image capture system 115 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera.

In some alternatives, additional sensors may be included in the vehicle 124. An engine sensor 111 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 113, may include a steering wheel angle sensor, a speedometer sensor, or a tachometer sensor.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to the output of the neural network or other model and other geographic data received from geographic database 123 and the server 125 to generate driving commands or navigation commands.

The current embodiments provide a constant availability of GNSS readings which results in constant availability of autonomous and ADAS functions. For example, constant lane level tracking and precise positioning may be provided. In some examples, autonomous or ADAS function suffer discontinuous service in black spot areas or in urban canyons. The proposed STGGAN model overcomes these disruptions.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to the output of the neural network or other model and/or other geographic data received from geographic database 123 and the server 125 to generate driving commands or navigation commands. For example, the may provide a driving command to the vehicle 124 based on the output of the neural network or other model.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and may respond to the output of the neural network or other model and other geographic data received from geographic database 123 and the server 125 to generate driving commands or navigation commands.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the output of the neural network or other model and other geographic data received from geographic database 123 and the server 125 to generate driving commands or navigation commands.

The routing instructions may be provided by display 914. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments, which may be determined based on the output of the neural network or other model and other factors.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

The geometric features may include curvature, slope, or other features. The curvature of a road segment describes a radius of a circle that in part would have the same path as the road segment. The slope of a road segment describes the difference between the starting elevation and ending elevation of the road segment. The slope of the road segment may be described as the rise over the run or as an angle.

The restrictions for traveling the roads or intersections may include turn restrictions, travel direction restrictions, speed limits, lane travel restrictions or other restrictions. Turn restrictions define when a road segment may be traversed onto another adjacent road segment. For example, when a node includes a "no left turn" restriction, vehicles are prohibited from turning left from one road segment to an adjacent road segment. Turn restrictions may also restrict that travel from a particular lane through a node. For example, a left turn lane may be designated so that only left turns (and not traveling straight or turning right) is permitted from the left turn late. Another example of a turn restriction is a "no U-turn" restriction.

Travel direction restriction designate the direction of travel on a road segment or a lane of the road segment. The travel direction restriction may designate a cardinal direction (e.g., north, southwest, etc.) or may designate a direction from one node to another node. The roadway features may include the number of lanes, the width of the lanes, the functional classification of the road, or other features that describe the road represented by the road segment. The functional classifications of roads may include different levels accessibility and speed. An arterial road has low accessibility but is the fastest mode of travel between two points. Arterial roads are typically used for long distance travel. Collector roads connect arterial roads to local roads. Collector roads are more accessible and slower than arterial roads. Local roads are accessible to individual homes and business. Local roads are the most accessible and slowest type of road.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used. The database 123 may be incorporated in or connected to the server 125.

The geographic database 123 and the data stored within the geographic database 123 may be licensed or delivered on-demand. Other navigational services or traffic server providers may access the location fingerprint data, traffic data and/or the lane line object data stored in the geographic database 123.

The processor 901 may include a general processor, digital signal processor, an application specific integrated circuit (ASIC), field programmable gate array (FPGA), analog circuit, digital circuit, combinations thereof, or other now known or later developed processor. The processor 200 and/or processor 300 may be a single device or combinations of devices, such as associated with a network, distributed processing, or cloud computing.

The memory 904 may be a volatile memory or a non-volatile memory. The memory 904 may include one or more of a read only memory (ROM), random access memory (RAM), a flash memory, an electronic erasable program read only memory (EEPROM), or other type of memory. The memory 904 may be removable from the mobile device 122, such as a secure digital (SD) memory card.

The communication interface 918 may include any operable connection. An operable connection may be one in which signals, physical communications, and/or logical communications may be sent and/or received. An operable connection may include a physical interface, an electrical interface, and/or a data interface. The communication interface 918 provides for wireless and/or wired communications in any now known or later developed format.

The databases 123 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may include historical traffic speed data for one or more road segments. The databases may also include traffic attributes for one or more road segments. A traffic attribute may indicate that a road segment has a high probability of traffic congestion.

The input device 916 may be one or more buttons, keypad, keyboard, mouse, stylus pen, trackball, rocker switch, touch pad, voice recognition circuit, or other device or component for inputting data. The input device 916 and display 914 may be combined as a touch screen, which may be capacitive or resistive. The display 914 may be a liquid crystal display (LCD) panel, light emitting diode (LED) screen, thin film transistor screen, or another type of display. The output interface of the display 914 may also include audio capabilities, or speakers. In an embodiment, the input device 916 may involve a device having velocity detecting abilities.

The positioning circuitry 922 may include suitable sensing devices that measure the traveling distance, speed, direction, and so on, of the mobile device 122. The positioning system may also include a receiver and correlation chip to obtain a GNSS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 922 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 922 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A method for training a model for correction of a global navigation satellite system (GNSS), the method comprising:
receiving a plurality of GNSS signals, including at least one almanac value and at least one ephemeris value;
calculating a GNSS position based on the at least one almanac value and the at least one ephemeris value;

providing the at least one almanac value and the at least one ephemeris value to a spatio-temporal graph model; and receiving a corrected value from the spatio-temporal graph model, wherein the plurality of GNSS signals includes one or more signals from each of a plurality of satellites, each of the one or more signals including at least one almanac value and at least one ephemeris value.

2. The method of claim 1, further comprising:

calculating a difference between the corrected value to a true value, wherein the true value is based on historical data.

3. The method of claim 2, further comprising:

comparing the difference between the corrected value to the true value to a threshold.

4. The method of claim 3, further comprising:

sending, when the difference is less than the threshold, the corrected value to a mobile device or a GNSS receiver.

5. The method of claim 3, further comprising:

sending, when the difference is greater than the threshold, the corrected value to the spatio-temporal graph model.

6. The method of claim 1, further comprising:

calculating a GNSS position based on the corrected value received from the spatio-temporal graph model.

7. The method of claim 1, further comprising:

calculating a GNSS error based on the corrected value received from the spatio-temporal graph model.

8. The method of claim 1, wherein the at least one almanac value includes a clock value.

9. The method of claim 1, wherein the at least one ephemeris value includes satellite elevation, azimuth, bearing, a property of an axis or inclination correction.

10. The method of claim 1, wherein the at least one ephemeris value includes trajectory information.

11. A method for correction of a global navigation satellite system (GNSS), the method comprising:

receiving a plurality of GNSS signals, including at least one almanac value and at least one ephemeris value;

calculating an initial GNSS position based on the at least one almanac value and the at least one ephemeris value;

receiving a predetermined offset value for a base location;

generating a spatio-temporal graph model based on the initial GNSS position, the at least one almanac value, the at least one ephemeris value, and the offset value;

calculating a difference between the predetermined offset value for the base location to a predicted offset value by the spatio-temporal graph model; and comparing the difference between the predetermined offset value for the base location to the predicted offset value to a threshold value, wherein when the difference exceeds the threshold:

(1) additional training is performed on the spatio-temporal graph model; or (2) the predicted offset value is output from the spatio-temporal graph model.

12. The method of claim 11, wherein a corrected GNSS position is corrected based on the predicted offset value.

13. The method of claim 11, wherein the plurality of GNSS signals includes one or more signals from each of a plurality of satellites, each of the one or more signals including at least one almanac value and at least one ephemeris value.

14. An apparatus for correction of a global navigation satellite system (GNSS), the apparatus comprising:

a communication interface configured to receive a plurality of GNSS signals, including at least one almanac value and at least one ephemeris value; and a processor configured to generate a spatio-temporal graph model based on the at least one almanac value, the at least one ephemeris value, and a predetermined offset value for a base location, wherein the spatio-temporal graph model analyzes subsequent GNSS signals to determine a predicted offset or a corrected GNSS position, and wherein the plurality of GNSS signals includes one or more signals from each of a plurality of satellites, each of the one or more signals including at least one almanac value and at least one ephemeris value.

15. The apparatus of claim 14, wherein the at least one almanac value includes a clock value.

16. The apparatus of claim 14, wherein the at least one ephemeris value includes satellite elevation, azimuth, bearing, a property of an axis, inclination correction, or trajectory information.

* * * * *